(12) United States Patent
Greist et al.

(10) Patent No.: US 6,596,059 B1
(45) Date of Patent: Jul. 22, 2003

(54) AUTOMATED FILTER CHANGING DEVICE AND METHOD

(75) Inventors: Allan Clarkson Greist, Colorado Springs, CO (US); Robert Charles Stadjuhar, Jr., Woodland Park, CO (US)

(73) Assignee: Skyline Products, Inc., Colorado Springs, CO (US)

( * ) Notice: Subject to any disclaimer, the term of this patent is extended or adjusted under 35 U.S.C. 154(b) by 0 days.

(21) Appl. No.: 09/660,273

(22) Filed: Sep. 12, 2000

(51) Int. Cl.7 .......................... B01D 46/46; B01D 46/18
(52) U.S. Cl. .......................... 96/417; 96/420; 96/422; 96/423; 96/429; 55/351; 55/352; 55/354; 95/14; 95/23
(58) Field of Search ............................. 95/14, 17, 18, 95/23, 277; 96/420, 422, 423, 429, 417; 55/351, 352, 354, 422; 73/204.17, 204.11, 204.23; 165/257; 236/DIG. 9

(56) References Cited

U.S. PATENT DOCUMENTS

| | | | |
|---|---|---|---|
| 2,782,612 A | 2/1957 | Spiegelhalter | 62/129 |
| 2,848,064 A | 8/1958 | Gregory | 183/62 |
| 2,853,155 A | 9/1958 | Peter | 183/62 |
| 2,881,861 A | 4/1959 | Dyer | 183/62 |
| 3,175,775 A * | 3/1965 | Wurtenberg et al. | 55/354 |
| 3,276,191 A | 10/1966 | Revell | 55/354 |
| 3,337,898 A | 8/1967 | Schmid | 15/404 |
| 3,498,128 A * | 3/1970 | Calvet | 73/204.14 |
| 3,552,098 A | 1/1971 | Cochran | 55/274 |
| 3,596,006 A * | 7/1971 | Lawhon | 242/333.2 |
| 3,803,913 A * | 4/1974 | Tracer | 73/204.17 |
| 3,881,181 A * | 4/1975 | Khajezadeh | 73/204.25 |
| 3,985,528 A | 10/1976 | Revell | 55/352 |
| 3,988,928 A * | 11/1976 | Edstrom et al. | 73/204.19 |
| 4,054,521 A * | 10/1977 | Winzen | 55/352 |
| 4,221,576 A | 9/1980 | Phillips, Jr. | 55/352 |
| 4,524,315 A * | 6/1985 | Nakatani et al. | 318/6 |
| 4,770,037 A * | 9/1988 | Noir et al. | 73/204.12 |
| 4,830,642 A * | 5/1989 | Tatge et al. | 96/426 |
| 4,848,147 A * | 7/1989 | Bailey et al. | 73/204.17 |
| 5,217,513 A | 6/1993 | Armbruster | 55/274 |
| 5,364,026 A * | 11/1994 | Kundert | 236/49.3 |
| 5,429,649 A * | 7/1995 | Robin | 96/422 |
| 5,566,667 A | 10/1996 | Cox | 126/507 |
| 5,599,363 A | 2/1997 | Percy | 55/352 |
| 5,688,308 A * | 11/1997 | Voigts | 95/14 |
| 5,809,827 A * | 9/1998 | Kurisaki et al. | 73/204.17 |
| 5,831,159 A * | 11/1998 | Renger | 73/204.11 |
| 5,911,238 A * | 6/1999 | Bump et al. | 73/204.15 |
| 6,152,998 A * | 11/2000 | Taylor | 96/429 |
| 6,168,646 B1 * | 1/2001 | Craig et al. | 95/14 |

* cited by examiner

*Primary Examiner*—Duane Smith
*Assistant Examiner*—Jason M. Greene
(74) *Attorney, Agent, or Firm*—Law Office of Dale B. Halling, LLC (57) ABSTRACT

An automated filter changing device (20) includes a filter reel system (22). A motor (24) is connected to the filter reel system (22). An airflow sensor (26) is in an airflow of the filter reel system (22). A controller (28) is connected to the motor (24) and the airflow sensor (26). The airflow sensor (26) determines when the airflow is below an acceptable threshold. When the airflow is below an acceptable threshold, the controller (28) tells the motor (24) to index the filter reel system (22).

7 Claims, 9 Drawing Sheets

AUTOMATED FILTER CHANGING DEVICE AND METHOD

FIELD OF THE INVENTION

The present invention relates generally to the field of filters and more particularly to an automated filter changing device and method.

BACKGROUND OF THE INVENTION

Filters are used to remove particles from the air used for heating or cooling enclosures. Fans commonly pull the air through these filters. As the filters get dirty the air flow is reduced. Eventually the air flow is so low that the device cannot heat or cool the enclosure efficiently. At this point or sooner the filter needs to be replaced. In some cases these enclosures are not easy to access. For instance, variable message highway signs require cooling and are often hard to access. Changing the filters in these signs requires a maintenance person to drive miles and climb into the sign to change the filter. Commonly, the maintenance people set up a standard schedule to change these filters. This results in the filters being changed unnecessarily or not being changed soon enough. As a result this process is very expensive and inefficient.

Prior art systems have measured the pressure of the air on the filter to determine when a filter requires changing. Unfortunately, these pressure sensors do not give an indication of the airflow. The pressure may not be above a threshold because the fan is not working or there is a hole in an associated plenum. As a result, there is inadequate airflow but the pressure sensor does not sense these problems.

Thus there exists a need for an automated filter changing device that overcomes these and other problems.

DETAILED DESCRIPTION OF THE DRAWINGS

An automated filter changing device includes a filter reel system. A motor is connected to the filter reel system. An airflow sensor is in an airflow of the filter reel system. A controller is connected to the motor and the airflow sensor. The airflow sensor determines when the airflow is below an acceptable threshold. When the airflow is below an acceptable threshold, the controller tells the motor to index the filter reel system. Thus the system automatically changes the filter media when it starts to overly restrict the airflow. Note that the invention is described in the context of cooling an enclosure, however it could also be used for ventilating or heating.

Figure 1:
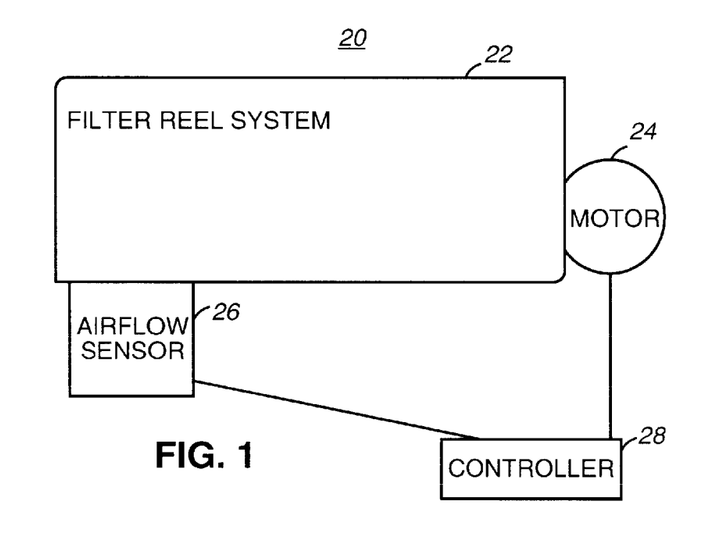
FIG. 1 is a block diagram of an automated filter changing device in accordance with one embodiment of the invention.

FIG. 1 is a block diagram of an automated filter changing device 20 in accordance with one embodiment of the invention. The automated filter changing device has a filter reel system 22. A motor 24 is connected to the filter reel system 22. An airflow sensor 26 is in an airflow of the filter reel system 22. A controller 28 is connected to the motor 24 and the airflow sensor 26.

Figure 2:
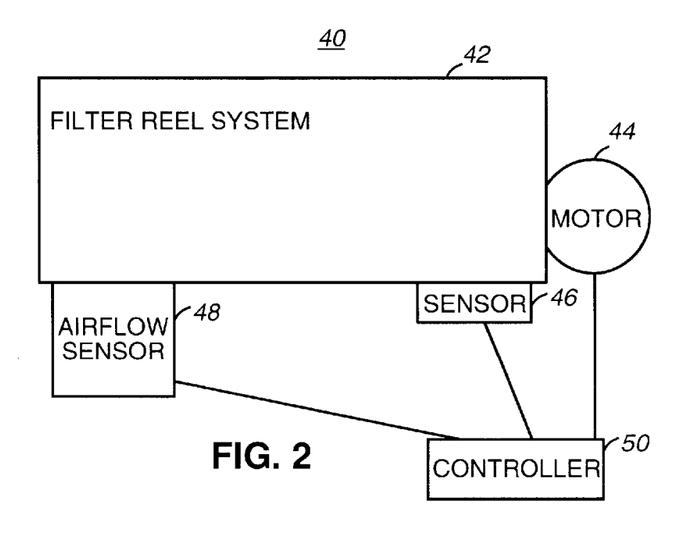
FIG. 2 is a block diagram of an automated filter changing device in accordance with one embodiment of the invention.

FIG. 2 is a block diagram of an automated filter changing device 40 in accordance with one embodiment of the invention. The device 40 includes a filter reel system 42. A motor 44 is connected the filter reel system 42 and drives a filter media. A position sensor (contact switch, barcode reader, optical sensor, micro-switch) 46 is connected to the filter reel system 42. In one embodiment the contact switch is replaced with a proximity switch sensor. The contact switch 46 detects an index mark (mark) on the filter media that indicates when a new length of filter media is in place. An airflow sensor 48 is in the air flow of the filter reel system 42. As will be apparent to those skilled in the art the airflow sensor can be on the intake side or the output side of the filter. The airflow sensor 48 is connected to the controller 50.

Figure 3:
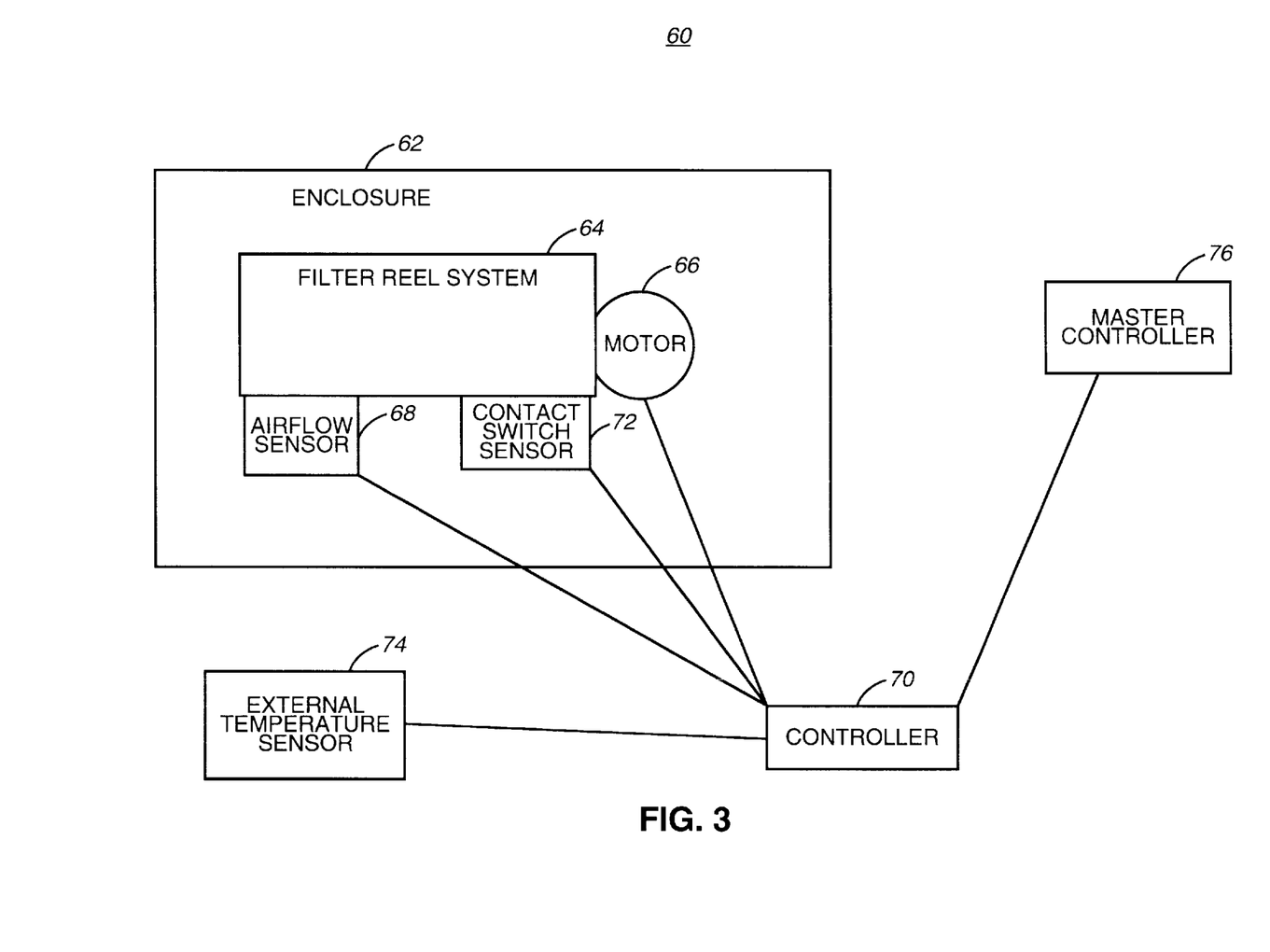
FIG. 3 is a block diagram of an automated filter changing device in accordance with one embodiment of the invention.

FIG. 3 is a block diagram of an automated filter changing device 60 in accordance with one embodiment of the invention. The diagram shows an enclosure 62 to be cooled (or heated). The filter reel system 64 is contained in the enclosure 62. Generally, the filter reel system fits in a plenum that connects the inside of the enclosure to the outside. A motor 66 is connected to the filter reel system 64. An airflow sensor 68 is in the airflow of the filter reel system 64. When the airflow sensor 68 indicates that the filter media requires changing, it sends a signal to the controller 70. The controller: 70 may be inside the enclosure 62 or outside the enclosure 62. The. controller 70 sends a signal to the motor 66 to start advancing the filter media. When the contact switch sensor 72 senses an index mark, it sends a signal to the controller 70. The controller 70 directs the motor 66 to stop rotating. An external temperature sensor 74 is connected to the controller 70. The external temperature sensor 74 is used by the controller 70 to determine if turning on a fan will be effective. When the system uses outside air to cool the enclosure 62 there is no reason to turn on the fan if the outside temperature is higher than the temperature inside the enclosure 62. In one embodiment, a second temperature sensor is inside the enclosure but not in the airflow.

The controller 70 is also connected to a master controller 76. The master controller 76 is generally connected to several controllers that are attached to enclosures such as variable highway signs. When an index mark is detected, the controller 70 sends a message to the master controller 76 in one embodiment. This allows the master controller to monitor the number of used filter sheets. When there is a problem such as the filter media is completely used up, the controller 70 sends a message to the master controller 76. Maintenance personnel are notified by the master controller 76 of the problem. The contact switch 72 detects an alerting index when the filter media is almost completely gone. In one embodiment, a separate alerting sensor detects the alerting index. The contact switch 72 sends a signal to the controller indicating that an alerting index has been detected. The controller 70 then sends a signal indicating that the filter media is near the end of the roll to the master controller.

Figure 4:
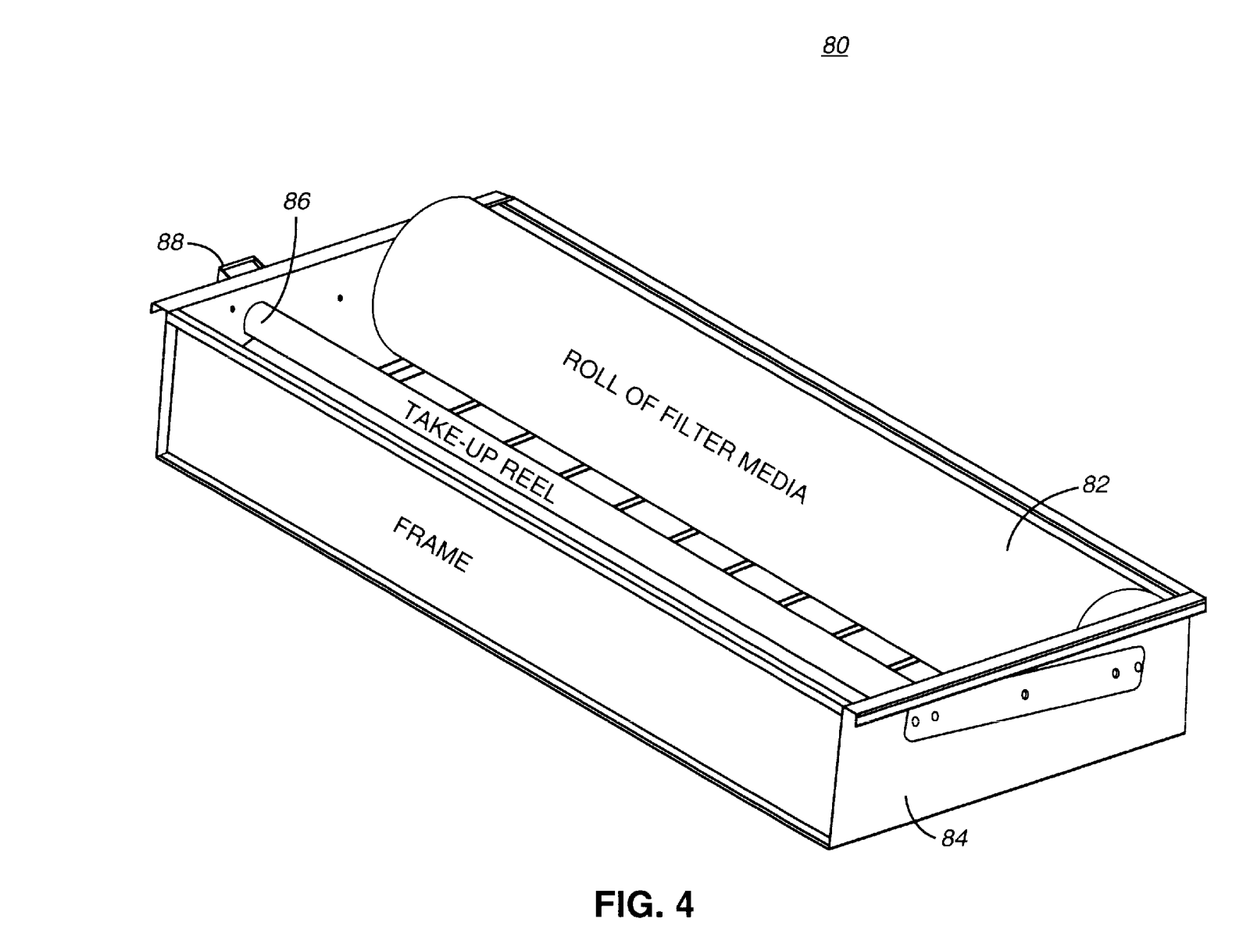
FIG. 4 is a perspective drawing of a filter reel system in accordance with one embodiment of the invention.

FIG. 4 is a perspective drawing of a filter reel system 80 in accordance with one embodiment of the invention. The filter reel system 80 has a roll of filter media 82 in a frame 84. The frame 84 is designed to fit inside of a plenum of the heating or cooling system. A take-up reel 86 is connected to an end of the filter media. The take-up reel 86 is connected to a motor 88 that drives the take-up reel. The filter media extends across the frame 84 and the air flows through the filter media. In one embodiment, the supply reel has a slight amount of tension to hold the filter media taut.

Figure 5A:
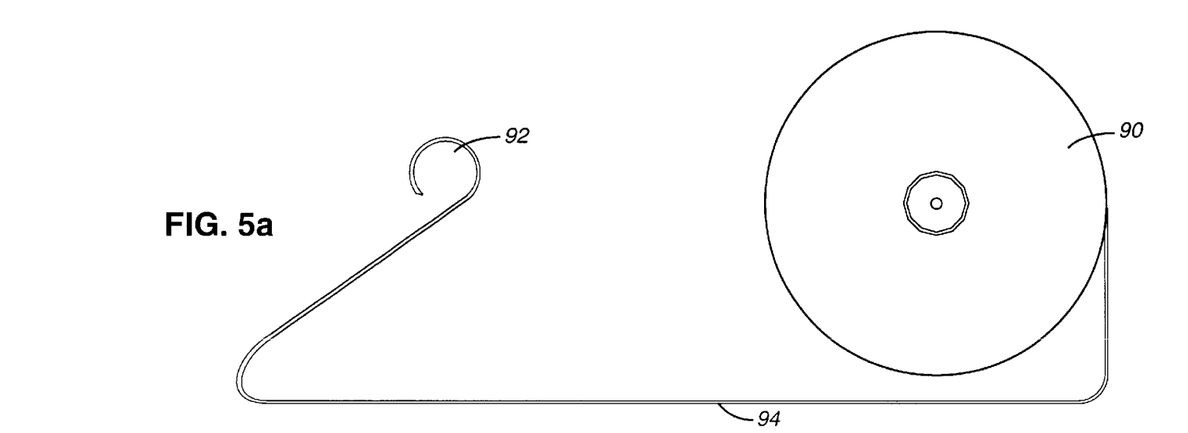
FIGS. 5a & 5b are partial cross sectional views of a filter reel system in accordance with one embodiment of the invention.
Figure 5B:
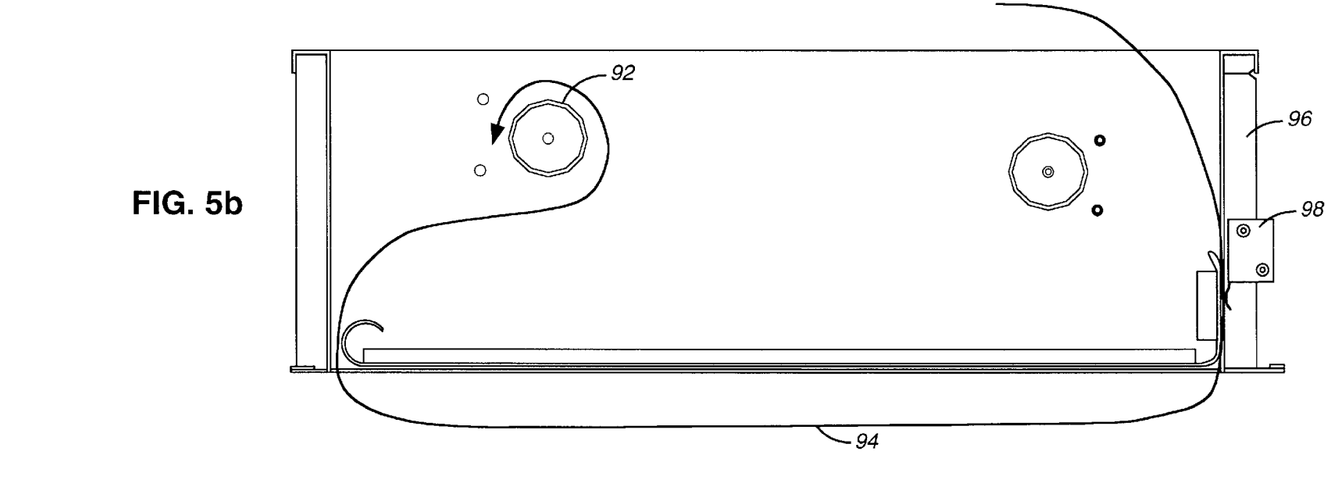

FIGS. 5a & 5b are partial cross sectional views of a filter reel system in accordance with one embodiment of the invention. FIG. 5a shows the roll of filter material 90 and the take-up side of the filter media 92. The drawing also shows how the filter media 94 extends across the frame 96. FIG. 5b shows the frame structure 96 and the contact switch 98.

Figure 6:
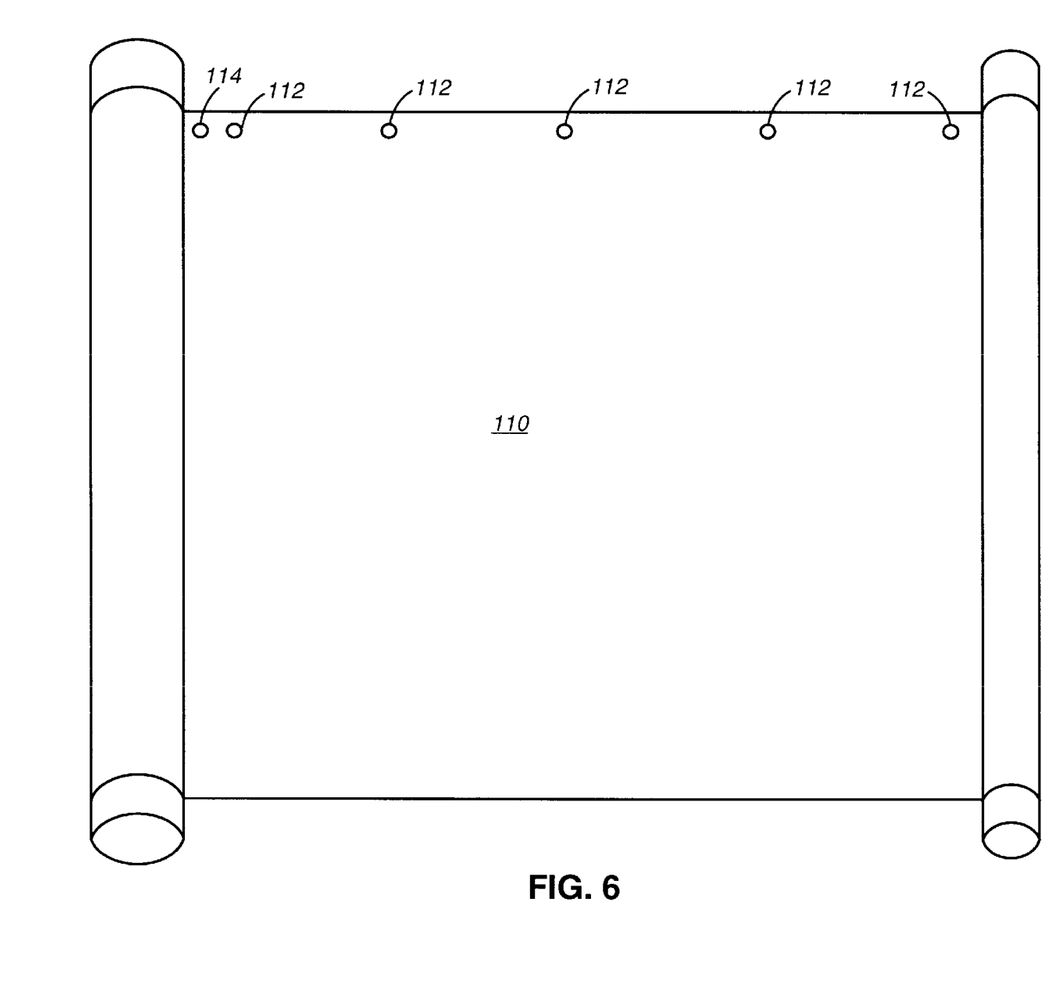
FIG. 6 is a top view of a filter media in accordance with one embodiment of the invention.

FIG. 6 is a top view of a filter media 110 in accordance with one embodiment of the invention. The filter media 110 has plurality of index marks 112 that mark a complete length of the filter media 110. The index marks 112 are shown as holes in the filter media 110. These holes are sensed when a probe of the contact switch extends into the hole. As will be apparent to those skilled in the art a number of other approaches can be used to define the index marks. For instance, the index marks can be magnetized metal threads that are sensed by a Hall Effect sensor or the index marks can be reflective disks that are sensed by a light source and a light sensor. An alerting index mark 114 is also shown. The alerting index 114 is a hole closely spaced to one of the index marks 112. In one embodiment an alerting index mark 114 is placed on the last several lengths of the filter media. In another embodiment, the holes or marks are replaced with bar codes. Since each bar codes is unique it can tell the controller exactly the number of lengths (sheets) left on the roll of filter material.

Figure 7A:
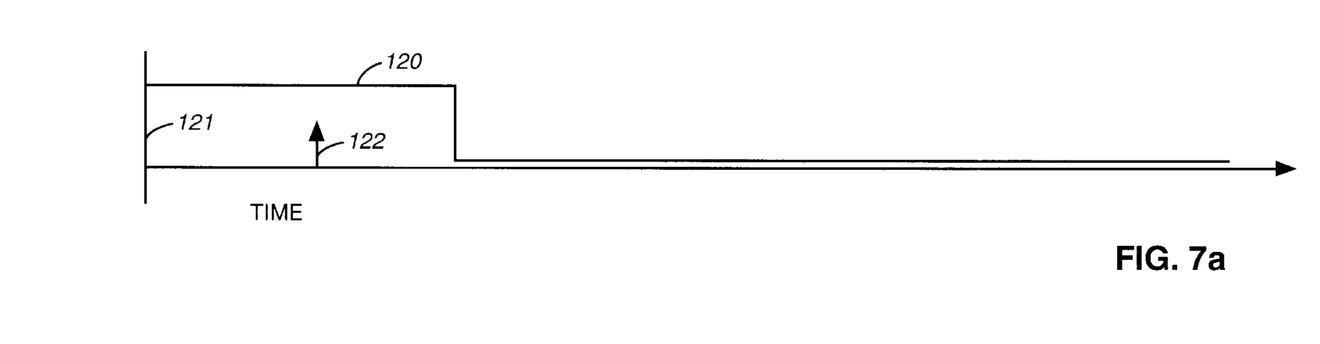
FIGS. 7a, 7b & 7c are timing diagrams of a filter indexing system in accordance with one embodiment of the invention.
Figure 7B:
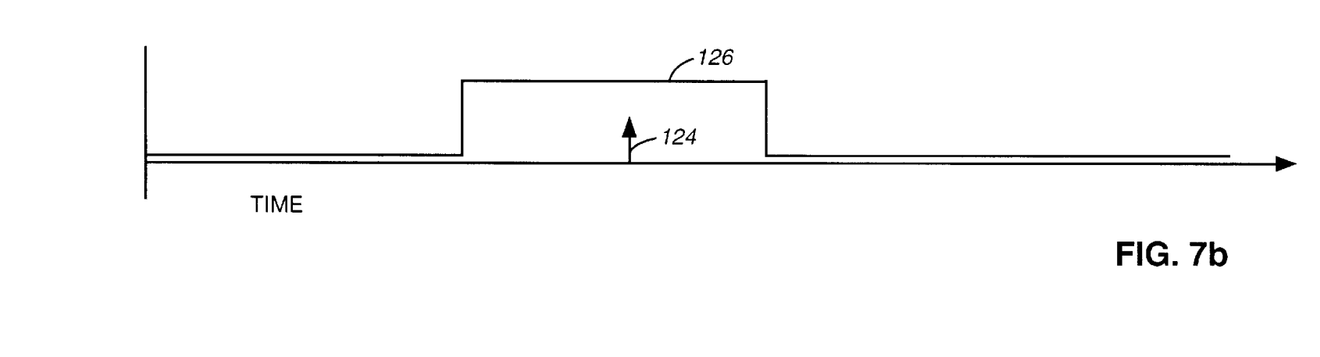
Figure 7C:
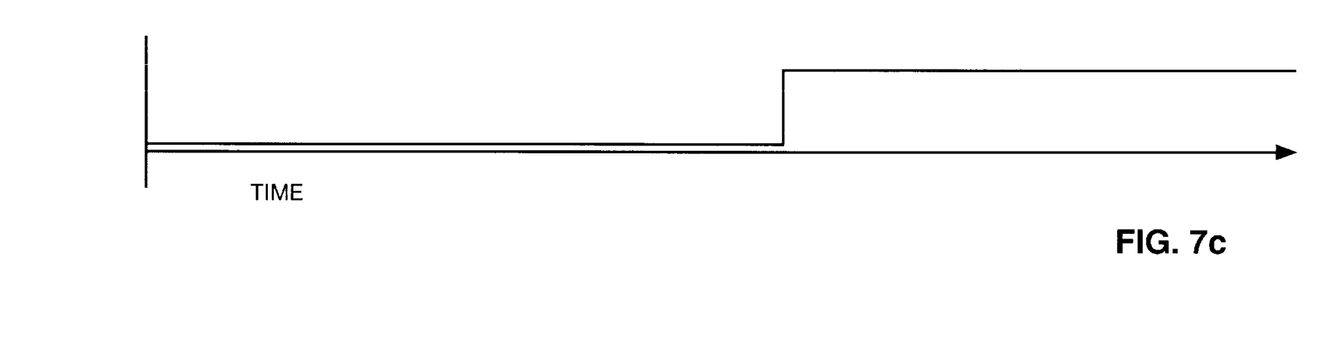

FIGS. 7a, 7b & 7c are timing diagrams of a filter indexing system in accordance with one embodiment of the invention. FIG. 7a shows the situation where an alerting index mark is detected. An alerting period is determined by an alerting square wave 120. The beginning 121 of the square wave corresponds to the contact switch moving out of the previous index mark. The alerting index is shown as a spike 122 and the spike is created by the contact switch closing (opening). When the index mark 122 occurs while the alerting square wave 120 is high, the controller knows that an alerting index has been detected. The master controller is notified that filter material is near the end of the roll. As will be apparent to those skilled in the art other methods could be used to determine if an index mark is detected during the alerting period.

FIG. 7b shows the case where the index mark 124 is detected during an index period 126. This indicates that the motor should be stopped because a completely new length of the filter material has been scrolled. FIG. 7c shows the case where no index mark is detected during an alerting or indexing period. This indicates that a problem exists. The problem could be that the motor is not working or that the filter material has come loose from the roll. Either way the motor is stopped after a period of time and the master controller is notified that there is a problem.

Figure 8:
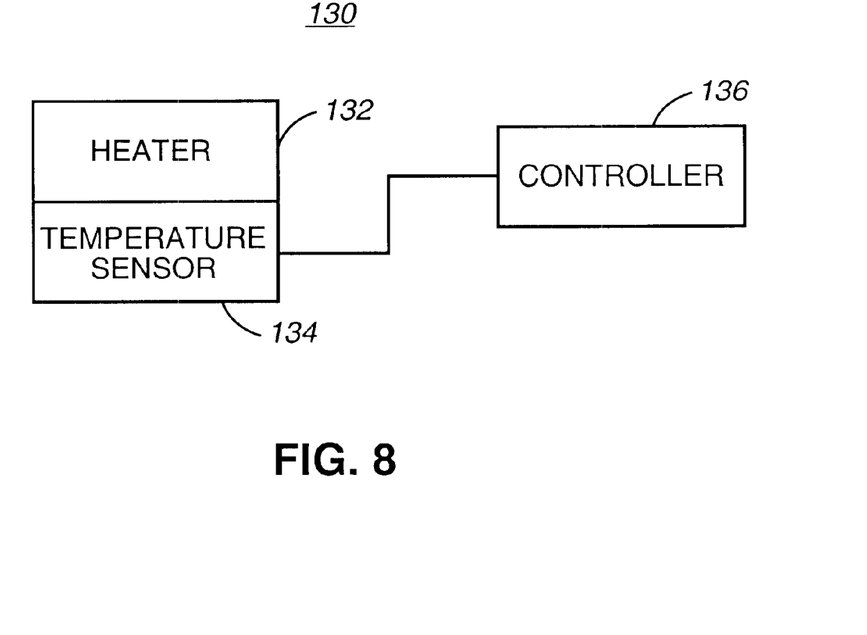
FIG. 8 is a block diagram of an airflow sensor in accordance with one embodiment of the invention.

FIG. 8 is a block diagram of an airflow sensor 130 in accordance with one embodiment of the invention. The airflow sensor 130 has heater 132 that is thermally coupled to a temperature sensor 134. The temperature sensor 134 is connected to a controller 136. The controller 136 has a formula that correlates a rate of temperature change to an airflow rate. In one embodiment, the formula takes into account the external air temperature. The airflow sensor 130 is easily calibrated by taking measurements under known conditions. The data points from these measurements can be used to construct the formula that correlates airflow, rate of temperature change and the temperature differential between the outside air and the temperature of the temperature sensor with no airflow. In one embodiment the controller has a table (plurality of tables) the correlates a rate of change in temperature to an airflow.

In one embodiment, the heater is a resistor with a known current applied. The temperature sensor (airflow sensor) is a thermocouple. In another embodiment, the temperature sensor (airflow sensor) is a semiconductor. In another embodiment, the temperature sensor (airflow sensor) is an integrated circuit with an integral heater.

Figure 9:
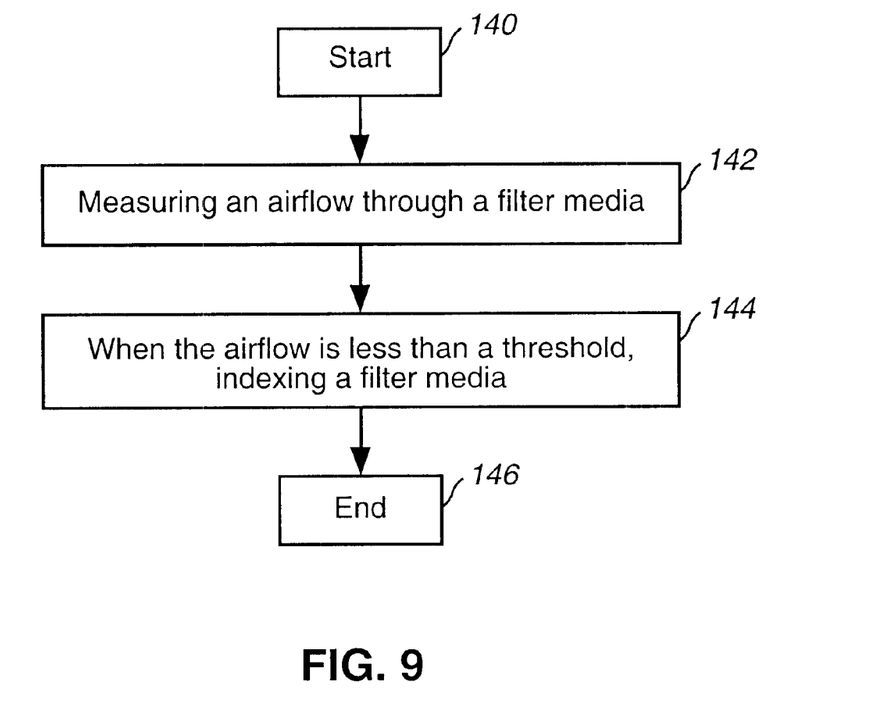
FIG. 9 is a flow chart of the steps in a method of operating an automated filter changing device in accordance with one embodiment of the invention.

FIG. 9 is a flow chart of the steps in a method of operating an automated filter changing device in accordance with one embodiment of the invention. The process starts, step 140, by measuring an airflow through a filter media at step 142. When the airflow is less than a threshold at step 144, the filter media is indexed which ends the process at step 146. In one embodiment, the airflow is determined by measuring a no airflow temperature. Then a temperature sensor is heated and a fan is started. The rate of temperature change is measured and this can be related to an airflow. In one embodiment, the rate of temperature change is found by determining when a predetermined period of time has elapsed after starting the fan. A new temperature is noted. In one embodiment, a lookup in a database using the rate of temperature change is performed to determine the airflow. In another embodiment, a lookup in a table using the rate of temperature change is performed to determine the airflow. In another embodiment, an algorithm is used to convert the rate of temperature change into an airflow. The algorithm may be determined by a curve fitting technique.

The filter media is indexed in one embodiment. When the motor is started the take-up reel starts to turn. When an index mark of the filter media is detected, the motor is stopped. When the index mark is detected within a first time interval, a main controller is signaled. This alerts the main controller that the filter material is almost at the end of the roll. When the index mark is detected within a second time interval, the motor is stopped. When an index mark is not detected at an end of the second time interval, the motor is stopped. This situations indicates a problem, such as the motor is not working. The main controller is sent a signal notifying the main controller of the problem.

Figure 10:
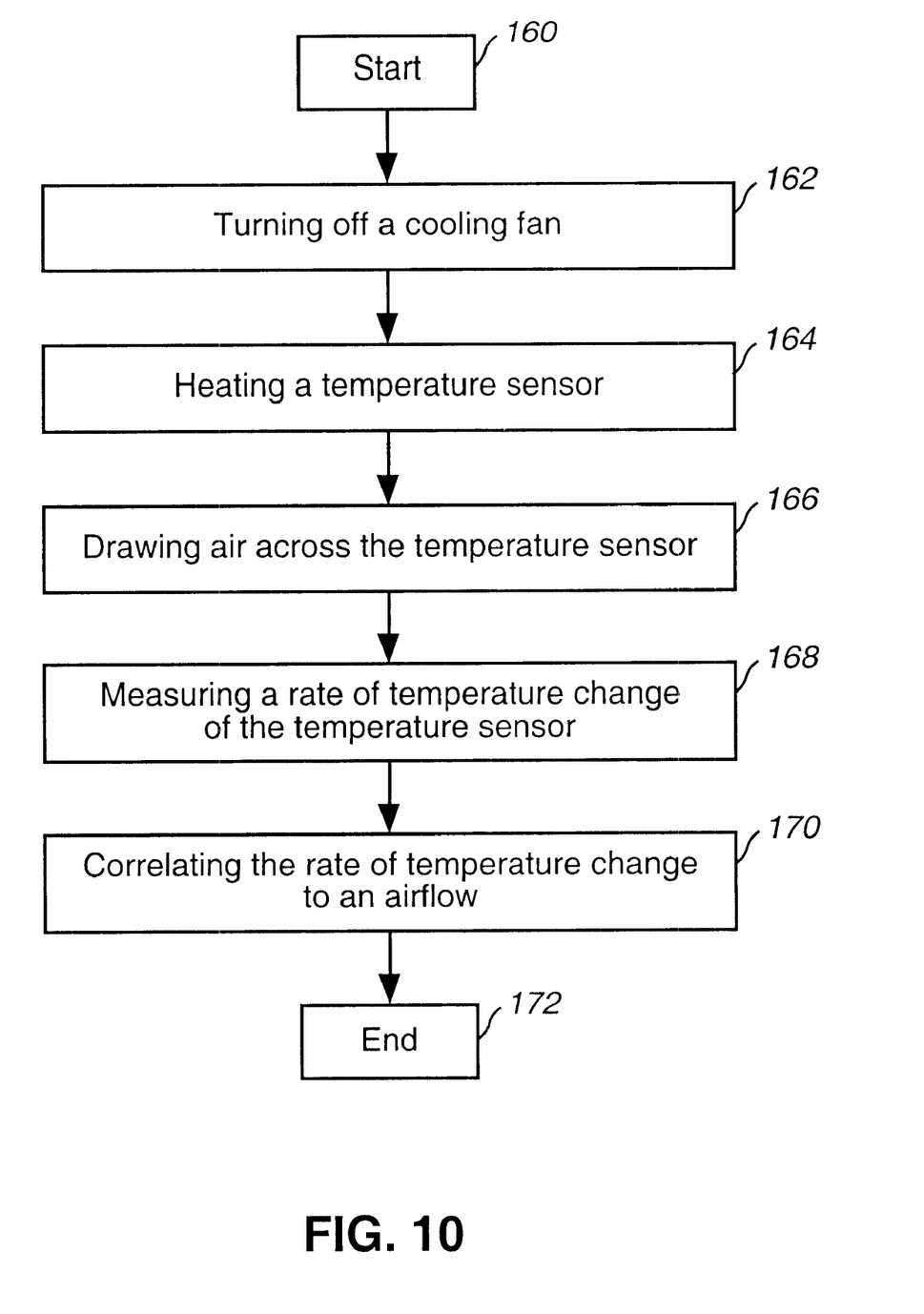
FIG. 10 is a flow chart of the steps in a method of measuring an airflow in accordance with one embodiment of the invention.

FIG. 10 is a flow chart of the steps in a method measuring an airflow in accordance with one embodiment of the invention. The process starts, step 160, by turning off a cooling fan at step 162. A temperature sensor is heated at step 164. Air is drawn across the heated temperature sensor at step 166. A rate of temperature change of the temperature sensor is measured at step 168. At step 170, the rate of temperature change is correlated to an airflow which ends the process at step 172. Note that the heater thermally coupled to the temperature sensor does not ever have to be turned off. In one embodiment, a controller determines when a predetermined period of time has elapsed after starting the fan. A new temperature is noted.

Figure 11:
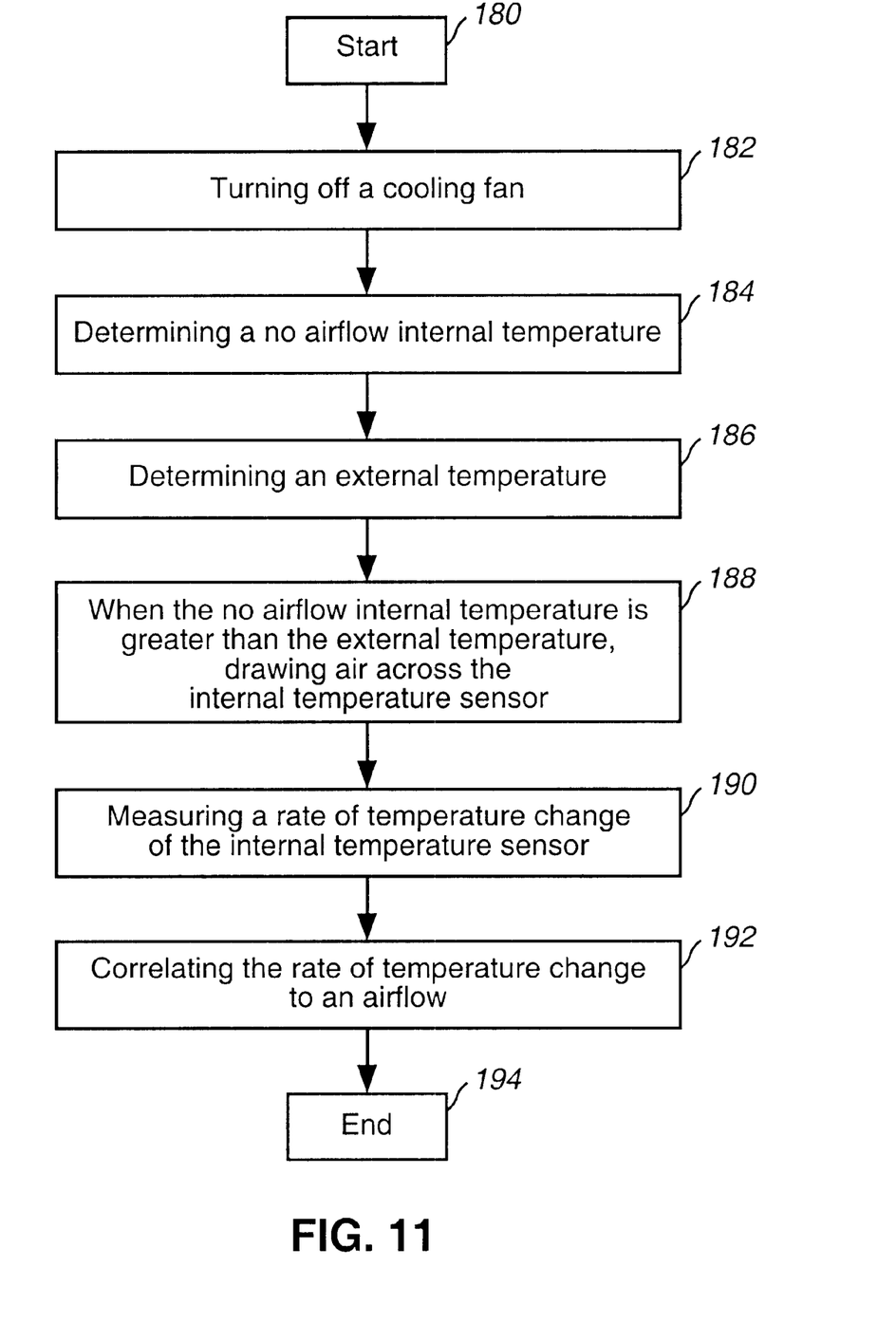
FIG. 11 is a flow chart of the steps in a method of cooling an enclosure in accordance with one embodiment of the invention.

FIG. 11 is a flow chart of the steps in a method of cooling an enclosure in accordance with one embodiment of the invention. The process starts, step 180, by turning off a cooling fan at step 182. A no airflow internal temperature is determined at step 184. An external temperature is determined at step 186. When the no airflow internal temperature is greater than the external temperature, the air is drawn across an internal temperature sensor at step 188. A rate of temperature change of the internal sensor is measured at step 190. At step 192 the rate of temperature change is correlated to an airflow which ends the process at step 194. When the no airflow internal temperature is less than the external temperature, returning to step 182.

Thus there has been described an automated filter changing device and method that does not rely on a pressure measurement. The invention is also capable of detecting a number of other problems and reporting them to a master controller. The invention significantly reduces the cost of changing air filters in variable highway signs.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An automated filter changing device, comprising:

a filter reel system having a roll of filter media which has an index along a length, the index having index marks and a hole near one of the index marks, the roll of filter media held by a frame that fits in a plenum of transportation sign;

a motor connected to the filter reel system;

an airflow sensor in an airflow of the filter reel system;

a controller connected to the motor and the airflow sensor; and a master controller in communication with the controller and receiving a signal indicating that the filter media is near the end of the roll.

2. The device of claim 1, wherein the hole is an alerting index.

3. The device of claim 1, wherein the airflow sensor comprises:

a temperature sensor connected to the controller;

a heater thermally coupled to the temperature sensor; and the controller correlating a rate of temperature change to an airflow.

4. The device of claim 1, wherein the airflow sensor comprises:

a first temperature sensor connected to the controller and in the airflow of the filter reel system;

a second temperature sensor connected to the controller and outside the filter reel system;

a heater thermally coupled to the first temperature sensor; and the controller correlating a rate of temperature change to an airflow.

5. The device of claim 1, wherein the controller connects to a position sensor, enabling the controller to detect an index mark on a filter media of the filter reel system.

6. A The device of claim 1, wherein the controller connects to a proximity switch sensor, enabling the controller to detect a mark on a filter media of the filter reel system.

7. The device of claim 1, wherein the controller further includes a formula that correlates a rate of temperature change to an airflow.

\* \* \* \* \*